Aug. 10, 1926.
H. A. DE VRY
SLIDE SHIFTER FOR STEREOPTICONS
Filed July 25, 1921
1,595,077
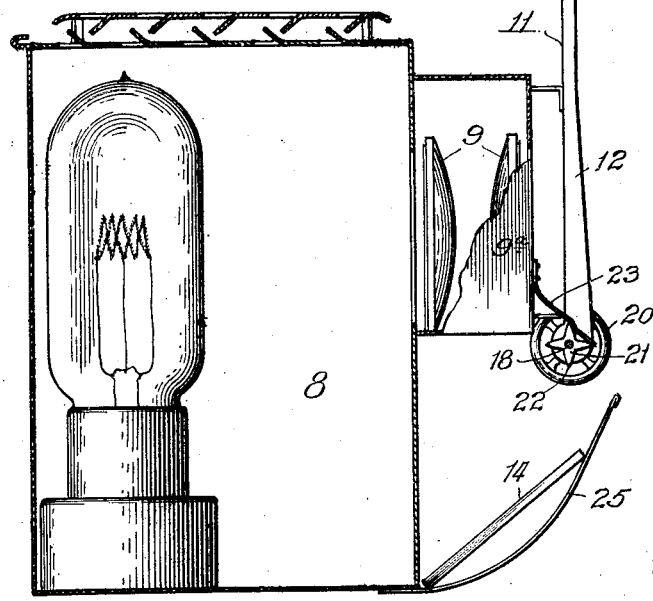
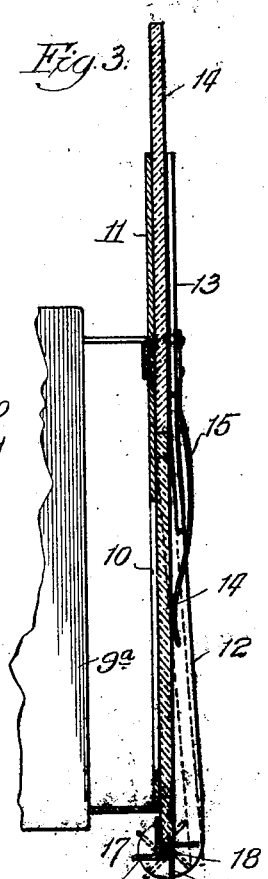
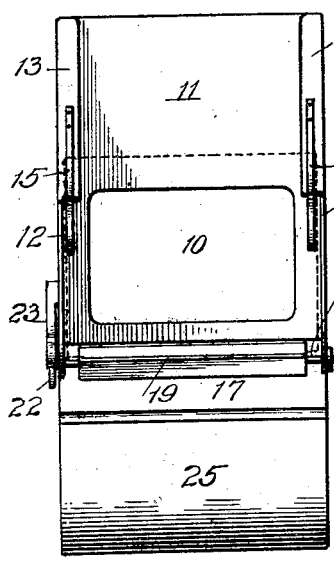
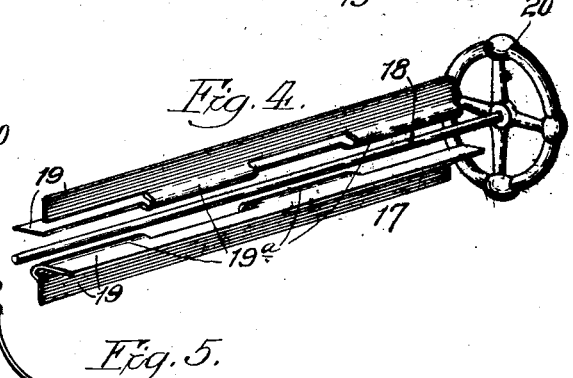
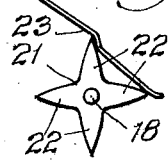
Witness:
John Enders
Inventor:
Herman A. de Vry
by Fred Gerlach
his Atty.

Patented Aug. 10, 1926.

1,595,077

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

SLIDE SHIFTER FOR STEREOPTICONS.

Application filed July 25, 1921. Serial No. 487,296.

The invention relates to devices for shifting slides in stereopticons.

The object of the invention is to provide an improved slide shifter which is simple in construction, efficient in operation and in which the slides, after being released, are positively displaced from a lower support and thus released to fall by gravity and the weight of superimposed slides.

The invention consists in the several novel features hereinafter set forth and more particularly defined by claims at the conclusion hereof.

In the drawings: Fig. 1 is a side elevation of a portion of a stereopticon embodying the invention, parts being shown in section. Fig. 2 is a front view. Fig. 3 is a vertical section on an enlarged scale. Fig. 4 is a perspective of the several parts of the releasing device. Fig. 5 is a detail of the yieldable stop device for the rotatable releasing device.

The invention is exemplified in a slide shifter applied to a stereopticon comprising a lamp-house 8, a condenser 9 and a slide-holder or guide for positioning the slides during projection. This guide or holder comprises a wall 11 secured to the condenser casing 9ª and in which is formed an opening 10 through which light is projected, sides 12 between which the slides are adapted to pass, and front flanges or members 13 adapted to lap the margins of the front of a slide in the holder. The holder-sides 12 are disposed to confine the plate against edgewise lateral displacement and the flanges or members 13 prevent the slide 14 from forward displacement. Springs 15 are adapted to press against the margins of the slides backwardly to hold them flatly against the front of plate 11. These springs are of insufficient tension to prevent the slides from falling through the guides by gravity but sufficient to hold them against the front of the plate 11. Front flanges 13 are spaced from wall 11 and terminate at a point above the lower end of a slide positioned for projection, so as to permit the lower end of the slide to be displaced forwardly from the support for its lower edge. The holder extends upwardly sufficiently to retain a second slide placed on the upper edge of the first slide.

A rotatable slide-support and releasing device 17 is adapted to successively support the slides in the guide and to shift their lower margins forwardly to clear the support so they will fall out of the holder by gravity. This releasing device comprises a shaft 18 which is journalled in bearings in the sides 12 and a series of members 19. A hand-wheel 20 is secured to shaft 17 so that the releasing device may be rotated step-by-step. Each member 19 of the releasing device is adapted to serve as a support engaged by the lower edge of a slide to retain it vertically in the guide and to positively deflect the lower portion of the slide forwardly, so it will clear the member acting to support the slide. As each member is shifted to deflect a slide forwardly, it passes into position to form a rest for the next slide descending in the holder. As each member is rotated from its horizontal supporting position, it is inclined downwardly and forwardly and thus facilitates the initial descent of the slide. The members 19 are preferably formed of plates of sheet-metal, each bent to form a pair of members connected by strips 19ª adapted to partly encircle the shaft 18, the strips of one pair being offset relatively to those on the other. The strips are usually soldered to the shaft 18.

A wheel 21, provided with arms or teeth 22 corresponding in number to the number of members 19 on the releasing device, is fixed to the shaft 18 outside of the guideway and a flat spring 23 is bent, so that it will bear on the wheel, as shown in Fig. 1, and so that the releasing device will be yieldingly arrested after each 90° step and so the springs will act to impel the releasing device during the latter portion of the cycle. A curved retainer plate 25 is supported under the guideway to catch the plates released therefrom and to retain them so they can be removed laterally.

In operation, the forwardly positioned member 19 of the rotatable support and releasing device 17 will arrest a slide deposited into the guideway and the springs 15 will press the slide backwardly against the front of the plate 11 into correct position for projection. When the slide is to be changed, the slide to be next exposed is deposited on the top of the first slide so that the second slide will be in readiness to quickly drop into correct position for exposure as the first slide is removed. The operator will then turn the releasing device a quarter of a revolution under guidance of the yieldable stop-device 21, 23. Such rotation will cause the member 19 in the rear of the lower margin of the plate to engage the back of the slide and positively push the lower portion of the slide forwardly, while the member on which the slide has been resting will be inclined downwardly, so that the slide will be deflected forwardly of the releasing device and will drop by gravity onto the retainer 25.

A characteristic of this construction is that such member 19 positively deflects the slide, and then passes into position to arrest the next slide before it is permitted to drop by the dropping of the first slide. Another characteristic is that the weight of the second slide is utilized to discharge the exposed slide from the member.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a slide shifter for stereopticons, the combination of a holder forming a vertical guideway adapted to receive a plurality of aligned slides with the lower edge of one slide resting on the top edge of another, and a device rotatable step-by-step and comprising a plurality of members, each adapted in rotative succession to displace transversely the lower slide from the guideway and to support the next slide.

2. In a slide shifter for stereopticons, the combination of a holder forming a vertical guideway adapted to receive a plurality of aligned slides with the lower edge of one slide resting on the top edge of another, a device rotatable step-by-step and comprising a plurality of members, each adapted in rotative succession to displace transversely the lower slide from the guideway and to support the next, and spring means to yieldingly hold the device so the members will be successively positioned to support the slides.

3. In a slide shifter for stereopticons, the combination of a holder forming a vertical guideway adapted to receive a plurality of aligned slides with the lower edge of one slide resting on the top edge of another, a device rotatable step-by-step and comprising a shaft and a plurality of outwardly extending members connected to said shaft, each member being adapted in rotative succession to displace transversely the lower slide from the guideway and to support the next, and a hand-wheel connected to the shaft whereby the device may be rotated step-by-step.

4. The combination of a guideway for slides, a rotatable device comprising a shaft, a plurality of integral longitudinally extending sheet metal blades secured on said shaft and forming rests and deflectors for the lower portions of slides in the holder.

5. The combination with a guideway for slides, of a rotatable device comprising a shaft, a plurality of supporting and deflecting members each formed of a plurality of integral longitudinally extending sheet metal blades secured on said shaft, and means for rotating the shaft.

HERMAN A. DE VRY.